United States Patent Office 3,422,031
Patented Jan. 14, 1969

3,422,031
METHOD FOR REACTIVATION OF OXIDE CATALYSTS
Jakov Rafailovich Katsobashvili and Galina Mikhailovna Belova, Moscow, U.S.S.R., assignors to Institute Neftekhimicheskogo Sinteza imeni A.V. Topchieva, Moscow, U.S.S.R.
No Drawing. Filed Nov. 17, 1964, Ser. No. 411,721
U.S. Cl. 252—417     8 Claims
Int. Cl. B01j *11/04*

ABSTRACT OF THE DISCLOSURE

A method of reactivating a catalyst deteriorated by carbonaceous materials deposited thereon in the course of hydrocracking diverse hydrocarbon feed stock. Hydrogen gas low in carbon monoxide is obtained as a result of the reactivation procedure.

The reactivation is carried out at a temperature of 600–750° C. and a pressure of 20–30 atm. with a gas consisting of oxygen and steam taken in a ratio of from 10:1 to 15:1 and containing additions of a hydrocarbon material injected into the deteriorated catalyst bed simultaneously with said steam-oxygen mixture. The gas produced as a result of the reactivation process consists essentially of $H_2$ and $CO_2$ and a small percentage of $H_2S$, CO and $CH_4$.

---

This invention relates to a process of oxidation-conversion reactivation of hydrogenation oxide catalysts which are coked in the course of hydrocracking accompanied by the production of hydrogen.

Processes for coked catalyst reactivation are known. In said processes, the coke is burnt out from the coked catalysts with the aid of an oxygen-containing gas. Here reactivation of the catalyst results in the formation of $CO_2$, and the temperature of the process is controlled by varying the oxygen content in the blast gas.

The prior art processes possess, however, a number of disadvantages, such as the facts that:

Heat should constantly be removed from the reaction zone, and special equipment is required to effect said heat removal;

The reactivation process becomes progressively more complicated with an increase in the degree of coke formation;

Temperature conditions of the process should be controlled.

An object of the present invention is to develop a process for the reactivation of hydrogenation catalysts and for the conversion of hydrocarbon gases and liquid fraction with steam, in which continuous heat removal is obviated and reactivation proceeds at a zero thermal effect, resulting from the utilization of the excess heat for the production of the by-product hydrogen.

For this purpose, in the process of the present invention the blast gas used consists of a steam-oxygen mixture and hydrocarbon fractions from processed oil are introduced into the catalyst bed to be reactivated.

In the blast gas, the steam-to-oxygen ratio is 10–15:1 depending on the amount and nature of the hydrocarbon raw material.

Blowing is carried out at a pressure from 20 to 30 atm. and the temperature of the reaction is maintained between 600 and 750° C.

Catalyst reactivation is effected not only by burning out the coke, but also by subjecting coke deposits to conversion with steam for which purpose the heat of coke combustion is used. In the process of conversion some carbon burns out in the reactivation space and the heat of carbon combustion makes it possible to carry out endothermal reactions between the carbon contained in the coke deposits and the carbon of the hydrocarbon raw material and steam and also to maintain the desired reaction temperature in the catalyst bed being reactivated.

The bulk of the carbon interacts with steam in the blast gas, and hydrogen is formed. Resulting from the fact that the hydrogenation oxide catalysts being reactivated are also capable of catalyzing the conversion of gaseous or liquid hydrocarbons, an additional quantity of hydrogen is obtained.

Catalyst reactivation may be carried out in a fixed, fixed fluidized, circulating fluidized, or a moving bed.

The present invention not only appreciably simplifies the process of catalyst reactivation, but also permits the regenerator to be simultaneously used as a converter for hydrogen generation.

EXAMPLE

To an alumino-molybdenum catalyst to be reactivated, containing 14.0% (w./w.) carbon in the form of coke deposits, oil tar was added in amount of 12.2% of the catalyst weight, and catalyst reactivation simultaneously with oil tar conversion was carried out at a temperature of 750° C. and 30 atm. pressure, the steam-to-oxygen ratio in the blast gas being between 10 to 15:1. The yield of gas was 249 cu. m./cu. m. of the catalyst per hour, The gas analysis was as follows (in volume percent):

$H_2S$, 1.2; $CO_2$, 37.1; $O_2$, 1.2; CO, 5.3; $H_2$, 50.6; $CH_4$, 4.6. Hydrogen yield was 125 cu. m./cu. m. of the catalyst per hour. Reactivation rate, 64.4 kg./cu. m. per hour.

We claim:

1. A method of reactivating a hydrogenation oxide catalyst coked in the course of hydrocracking with simultaneous production of hydrogen, said method comprising effecting oxidizing-conversion reactivation of the catalyst by the reaction of carbon with steam to form a gas consisting essentially of $CO_2$ and $H_2$, by blowing through the catalyst bed a steam-oxygen mixture in a ratio of steam to oxygen of between 10–15:1, at a temperature of between 600–750° C., under a pressure of approximately 30 atm. and feeding into the bed of the catalyst to be reactivated a hydrocarbon fraction to increase the hydrogen yield per unit of volume of the reactivated catalyst and for complete utilization of the steam of the steam-oxygen mixture fed for reaction.

2. A method as claimed in claim 1, in which the reactivation proceeds in a stationary catalyst bed.

3. A method as claimed in claim 1, in which the reactivation proceeds in a stationary fluidized catalyst bed.

4. A method as claimed in claim 1, wherein the reactivation is carried out in a circulating fluidized catalyst bed.

5. A method as claimed in claim 1, wherein the reactivation is carried out in a moving catalyst bed.

6. A method as claimed in claim 1, wherein the hydrocarbon fraction fed to the catalyst bed is obtained from the hydrocracking process.

7. A method as claimed in claim 6, wherein the hydrocarbon fraction is oil tar.

8. A method as claimed in claim 1 wherein said hydrocarbon fraction is in gaseous or liquid state.

References Cited

UNITED STATES PATENTS

| | | | |
|---|---|---|---|
| 2,067,729 | 1/1937 | Porter | 23—212 |
| 2,606,862 | 8/1952 | Kieth | 252—416 X |
| 2,640,009 | 5/1953 | Montgomery et al. | 252—420 X |
| 2,768,933 | 10/1956 | Burton et al. | 252—420 X |
| 2,963,419 | 12/1960 | Holm et al. | 252—416 X |

PATRICK P. GARVIN, *Primary Examiner.*

U.S. Cl. X.R.

23—212; 252—416, 418, 419, 420